Patented Apr. 8, 1952

2,592,311

UNITED STATES PATENT OFFICE 2,592,311

POLYVINYL CHLORIDE PLASTICS CONTAINING RESORCINOL MONOBENZOATE

Lester W. A. Meyer and William M. Gearhart, Kingsport, Tenn., assignors to Eastman Kodak Company, Rochester, N. Y., a corporation of New Jersey No Drawing. Application February 12, 1949, Serial No. 76,198

2 Claims. (Cl. 260—45.85)

This invention relates to polyvinyl chloride plastics, and more particularly to the stabilization of such plastics.

As is well known in the art, plastics having useful properties for a great many purposes can be prepared from polyvinyl chloride with suitable plasticizers. Many examples of suitable plasticizers are shown in the art. The choice of plasticizers forms no part of our invention. However, polyvinyl chloride plastics have not been entirely suitable for use in places where they are exposed to a considerable amount of ultra-violet light; e. g., out of doors. Upon outdoor exposure in a sunny climate, they undergo a breakdown of physical properties, such as strength. Some compounds whose addition to the plastic composition inhibits physical breakdown of the plastic cause discoloration when the plastic is exposed for any length of time to sunlight or other source of ultra-violet light. The object of our invention is to produce polyvinyl chloride plastics which will have increased resistance to deterioration by ultra-violet light.

We have found that the addition of a small proportion of resorcinol monobenzoate,

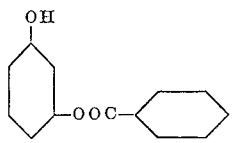

to a polyvinyl chloride plastic composition strongly inhibits breakdown of the resulting plastic by exposure to ultra-violet light. We prefer to use approximately 1% of resorcinol monobenzoate, based on the weight of polyvinyl chloride, but we may use somewhat less than 1% or as high as 2% or even somewhat more.

In testing polyvinyl chloride plastics containing resorcinol monobenzoate, we have employed an accelerated weathering test in the Kline sunlight-fog chamber, ASTM Designation D620–41T. This test is described in section B–14 of the Federal Specification for Plastics, Organic; General Specifications (Methods of Tests) L–P–406a, Method No. 6021, pages 57, 58 and 100, published by the U. S. Treasury Department, Federal Specifications Division. Two hundred hours under this test has been found to be roughly equivalent to one year of weathering in Washington, D. C. However, the climates of Florida and Arizona are much more severe as to ultra-violet light than the climate of Washington, D. C.

Three samples of 100 parts each of the same polyvinyl chloride resin were compounded with 20 parts of di-2-ethyl hexyl phthalate, as a plasticizer, and 2 parts of normal lead maleate as a stabilizer against decomposition of the resin to form hydrochloric acid. In one of these samples, 1 part of salol (phenyl salicylate) was incorporated as an ultra-violet inhibitor; in the second sample, 1 part of resorcinol dibenzoate was incorporated, and in the third sample, 1 part of resorcinol monobenzoate was incorporated. At the end of 148 hours in the Kline accelerated test, all the samples had become slightly dark. At the end of 286 hours, the sample containing the salol and the sample containing the resorcinol dibenzoate had developed definite brown stains, whereas the sample containing resorcinol monobenzoate had not developed brown stains or shown other evidence of failure at the end of 538 hours in the same test.

Resorcinol monobenzoate may be incorporated in polyvinyl chloride plastics by any of the known methods of compounding such plastics. We have used the method of mixing and working on hot rolls, in a manner well known in the art.

What we claim as our invention and desire to be secured by Letters Patent of the United States is:

1. A polyvinyl chloride plastic relatively stable to ultra-violet light consisting principally of polyvinyl chloride, and containing as an essential ingredient approximately 1%–2% of resorcinol monobenzoate based on the weight of the polyvinyl chloride.

2. A polyvinyl chloride plastic relatively stable to ultra-violet light consisting principally of polyvinyl chloride and a plasticizer therefor, and also containing as an essential ingredient approximately 1%–2% resorcinol monobenzoate based on the weight of the polyvinyl chloride.

LESTER W. A. MEYER.
WILLIAM M. GEARHART.

REFERENCES CITED

The following references are of record in the file of this patent:

UNITED STATES PATENTS

| Number | Name | Date |
|---|---|---|
| 2,034,283 | Clarke et al. | Mar. 17, 1936 |
| 2,157,068 | Carruthers et al. | May 2, 1939 |